Figure 1:
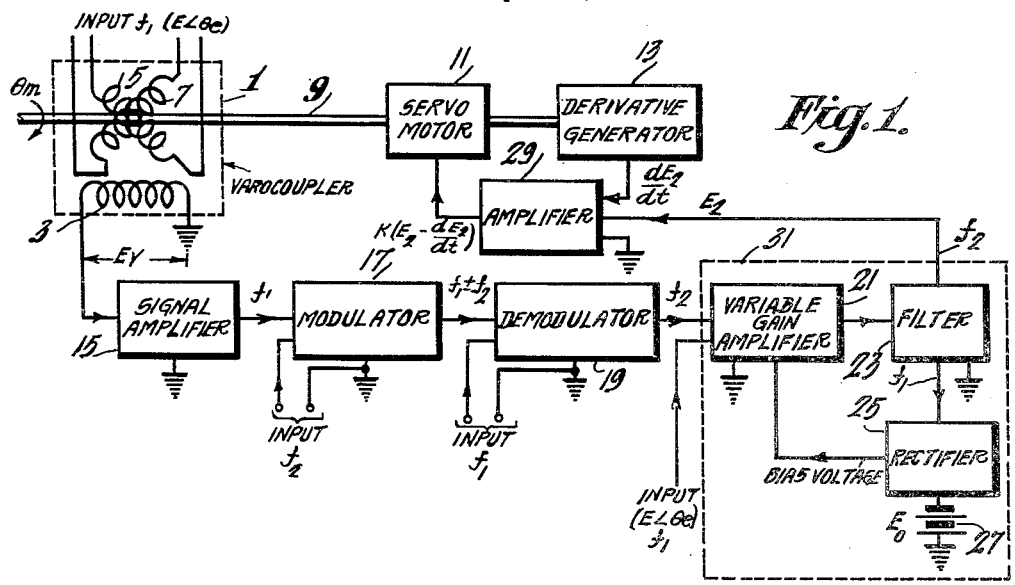

March 13, 1951　　　M. L. GREENOUGH　　　2,544,922
ENERGIZING CIRCUIT FOR SERVO SYSTEMS
Filed Sept. 29, 1945

INVENTOR.
Maurice L. Greenough
BY
ATTORNEY

Patented Mar. 13, 1951

2,544,922

UNITED STATES PATENT OFFICE 2,544,922

ENERGIZING CIRCUIT FOR SERVO SYSTEMS

Maurice Leighton Greenough, Groveland, Mass., assignor to Radio Corporation of America, a corporation of Delaware Application September 29, 1945, Serial No. 619,399

10 Claims. (Cl. 318—28)

This invention relates generally to electrical servo systems and more particularly to an improved energizing circuit for servo mechanisms for converting an electrical phase angle to a mechanical angle of rotation.

In electronic computing systems for solving ballistic functions in the process of sighting a gun at a remote, fixed or movable target, it is customary to convert the polar coordinates of the present position and course of the target to electrical voltages having magnitudes corresponding to the values of the Cartesian coordinates of the future target position as determined by the target velocity and by the ballistic characteristics of the weapon. The gun azimuth and elevation for deriving the proper trajectory for aiming the weapon at the future target position are converted from Cartesian coordinates in the horizontal and vertical planes to polar coordinates in said planes. The actual gun pointing is accomplished by synchronized motors actuated by servomotor mechanisms which are responsive to voltages corresponding to the angular components of the polar coordinates of the future target position.

For example, the gun azimuth is obtained by impressing upon the perpendicularly disposed rotor coils of a precision variocoupler the potentials derived from the electronic computer mechanism representing the future ground plane coordinates. Since the rotor coils are at right angles to each other, the intensity of the field established by them is proportional to the future ground range, and is spatially at an angle to the servo plane of the rotor windings which is equal to the future azimuth angle. The voltage induced in a fixed stator winding of the variocoupler, therefore, is proportional to the horizontal range and to the sine of the angle between the resultant field of the rotor windings and a plane perpendicular to the axis of the fixed stator winding.

The servomotor and the variocoupler rotor are mounted upon or geared to a common rotatable shaft. The output voltage derived from the variocoupler stator winding is applied to a converter-amplifier circuit which drives the servomotor in a direction which tends to reduce the stator voltage of the variocoupler to a zero value. In other words, the variocoupler rotor is rotated by the servomotor until the resultant field of the rotor windings is perpendicular to the axis of the stator winding, whereby the shaft is rotated through an angle equal to the azimuth angle. Correction voltages for windage and drift may be added in series with or coupled to the output voltage of the stator winding whereby such corrections may be effectively added to the normal azimuth angle. The resolving variocoupler and servomotor are coupled to synchronous motor units for coarse control of the gun pointing. Finer control of the gun pointing is obtained by other synchronous motors differentially connected to the coarse motor control and having a relatively high ratio of angular displacement to that of the variocoupler shaft.

The instant invention is an improvement upon the system disclosed and claimed in applicant's copending U. S. application Serial No. 619,398 filed September 29, 1945, now Patent Number 2,528,512, patented November 7, 1950. It comprises a novel converter-amplifier circuit interposed between the resolving variocoupler stator winding and the servomotor. It includes a circuit which is responsive to the relatively high computer frequency (for example, 2615 cycles) and to the power line frequency (60 cycles) for deriving a signal of the power line frequency which varies in amplitude substantially only as a function of the unbalance of the rotor and stator of the variocoupler. The converter-amplifier circuit includes a modulator, a demodulator, a single variable gain amplifier and an automatic volume control network therefor for stabilizing the loop gain of the circuit in order that the servomotor energizing currents may be substantially independent of variations in the amplitude of the variocoupler rotor currents.

The instant system utilizes a single variable gain amplifier for currents of both frequencies, as compared to the system disclosed in said copending application which requires two separate variable gain amplifiers in a circuit having a widely differing operational sequence.

In order to minimize hunting and overshooting by the servomotor, apparatus is provided for generating a correction current which is proportional to the rate of change of the servomotor energizing current. The correction current is effectively subtracted from the normal servomotor energizing current. This feature provides maximum starting and stopping torque while preventing abnormally high motor acceleration during the remainder of the time during which servomotor is rotated. This device is disclosed and claimed in applicant's copending U. S. application Serial No. 619,241, filed September 28, 1945, now Patent Number 2,497,216, issued February 14, 1950, assigned to the same assignee as the instant application.

The correction current generating circuit comprises a rotary differentiating voltage generator, the rotor of which may be separately driven by the servomotor energizing current or which may be connected directly to, or geared to, the servomotor shaft. The field of the generator is excited by currents of the same frequency as that of the servomotor energizing current. The differentiating current generator may comprise any well known type of rotary motor apparatus such as a two-phase motor, wherein the output voltage is directly proportional to the rate of change of the generator shaft angular velocity. This type differentiating current generator is superior to other types of reactive or passive networks in that the derivative signals generated thereby may be of relatively higher power or voltage. The servomotor may be a conventional shaded-pole reversible motor or any other of the type employed in conventional servo systems.

Among the objects of the invention are to provide an improved method of and means for operating servomotor systems. Another object is to provide an improved servomotor system having an inverse gain control circuit providing a constant system loop gain.

Another object is to provide an improved converter circuit for converting voltages derived from an unbalanced variocoupler to energizing voltages of a different frequency for actuating a servo mechanism to balance said variocoupler. A further object is to provide an improved converter circuit for a servo energizing network which is independent of the signal level in the servo control portion of said converter circuit. An additional object is to provide a servo energizing converter circuit utilizing a single variable gain amplifier the complete circuit having constant loop gain. Another object is to provide a frequency conversion system for energizing a servo system by currents of a first frequency in response to unbalance of currents of a second frequency.

A further object is to provide an improved servo system having a converter-amplifier circuit for converting an electrical phase angle to a mechanical angle of rotation of the servo mechanism and an anti-hunt circuit comprising a differentiating voltage network responsive to the servomotor energizing potential for generating a correction voltage proportional to the rate of change of the energizing voltage, wherein the correction voltage is subtracted from the servomotor energizing voltage. An additional object is to provide an improved servomotor energizing and correction voltage network including a resolving variocoupler for converting the Cartesian coordinates of a position to voltages representing the angular component of the polar coordinates of said position, a circuit for converting said voltages to provide angular rotation of said motor, means for generating and subtracting from the converted voltage a correction voltage proportional to the first derivative of said output voltage, for providing a driving voltage for a servo mechanism, and means coupling the servo mechanism to the variocoupler to balance said variocoupler.

Figure 2:
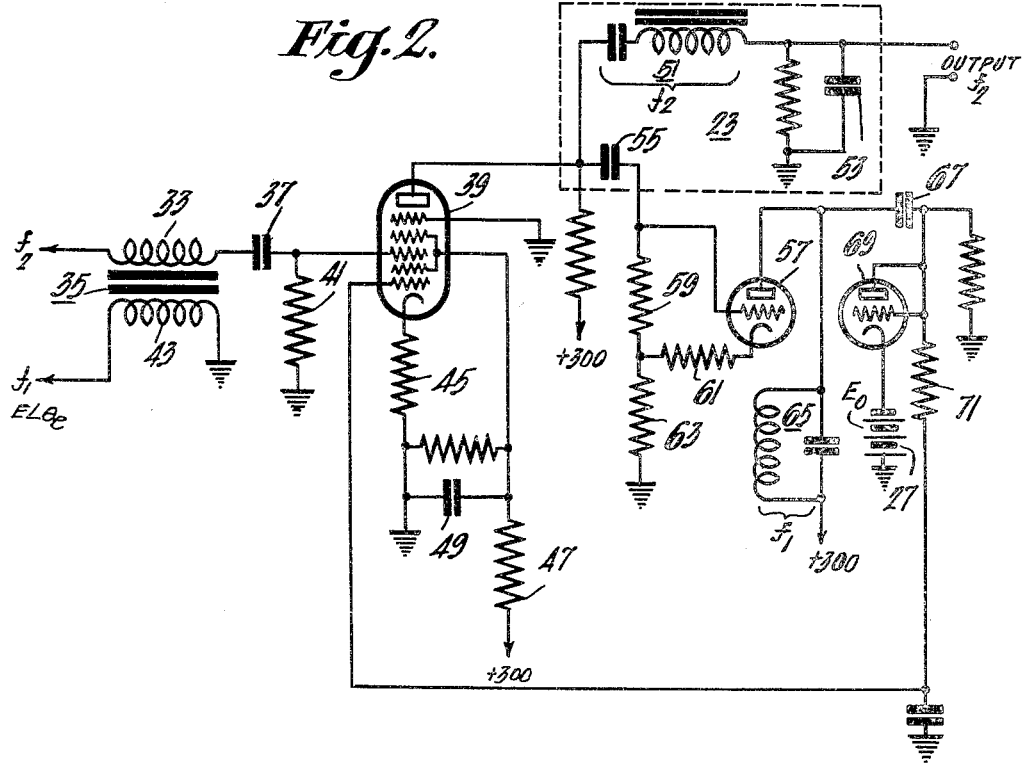

The invention will be described in greater detail by reference to the accompanying drawings of which Figure 1 is a block schematic circuit diagram of a servo system including a preferred embodiment of the invention, and Figure 2 is a schematic circuit diagram of a preferred embodiment of the novel variable gain amplifier and bias control circuit forming a component of said servomotor driving system. Similar reference characters are applied to similar elements throughout the drawings.

Referring to Figure 1, a servomotor control and stabilizing network includes a variocoupler type resolving device, a converter-amplifier for controlling the servo energizing currents as a function of the unbalance of the variocoupler, a servomotor, and a derivative generator for stabilizing the operation of the servomotor. The variocoupler 1 is of the precision type including a fixed stator winding 3 and a pair of perpendicularly-disposed rotatable rotor windings 5 and 7. The rotor shaft 9 of the variocoupler 1 is coupled to the armature of a servomotor 11 and to the armature of a derivative voltage generator 13. Input signals to the servo system applied to the rotor windings 5 and 7 correspond to the values of the Cartesian coordinates of a position to which the servo system is to be adjusted. The input voltages have a magnitude E at an electrical phase angle $\theta_e$.

It is desirable that the system shall have an operating characteristic which is substantially independent of the magnitude E of the input voltages since it is essential that the servomotor torque be proportional only to the angular deviation of the variocoupler rotor from balance. Therefore a converter-amplifier system is provided for deriving energizing currents for the servomotor which are a function only of the angular deviation of the variocoupler rotor from balance.

A linear signal amplifier 15 responsive to the output voltage $E_v$ of the variocoupler stator winding 3 provides a signal at the frequency $f_1$ having a magnitude $E_v = KE_\epsilon$, where $\epsilon$ is the angular deviation from balance of the variocoupler rotor. This relation holds for low values of $\epsilon$ where $\epsilon = \sin \epsilon$. For larger values, $\sin \epsilon$ should be substituted for $\epsilon$ throughout the description herein. The signal derived from the amplifier 15 is applied to the input circuit of a modulator 17. Signals of a second frequency $f_2$ (such as the power line frequency of 60 cycles) also are applied to the modulator 17. The combined signal frequency components $f_1$ and $f_2$ derived from the modulator 17 are applied to a demodulator 19 to which also are applied the input signals $E \angle \theta_e$ having a frequency $f_1$.

Thus signals of the power line frequency $f_2$ having magnitudes proportional to the angular deviation from balance $\epsilon$ of the variocoupler rotor are derived from the modulator 19 and applied to one input circuit of a variable gain amplifier 21. Also input signals of the frequent $f_1$ having a magnitude $E \angle \theta_e$ are applied to the variable gain amplifier.

A filter 23 responsive to the signals derived from the variable gain amplifier 21 selects the frequency component $f_1$ and applies it to a rectifier 25. The rectifier 25 is biased by a battery 27 which represents a source of reference potential $E_0$. Signals derived from the rectifier 25 thus have voltage magnitudes corresponding to the difference of the magnitude the filtered $f_1$ signal components and the reference potential $E_0$. The difference signal thus obtained is employed as an automatic bias control voltage which is applied to the variable gain amplifier 21 whereby the gain of the amplifier is inversely proportional to the signal magnitude of the $f_1$ input signals applied thereto. The gain of the variable gain amplifier 21 for the frequency component $f_2$ will be a constant times the gain of the amplifier for the frequency component $f_1$.

The frequency component $f_2$ derived from the filter 23 is applied to the input of a motor drive amplifier 29, the output of which is connected to the armature of the servomotor 11 to rotate the servomotor and the rotor windings 5 and 7 of the variocoupler 1 in a direction to balance the variocoupler. Such balance obtains when the resultant field of the rotor windings 5 and 7 is perpendicular to the axis of the stator winding 3 of the variocoupler. A derivative generator 13 coupled to the servomotor 11 is of the type described and claimed in applicant's copending application Serial No. 619,241, filed September 28, 1945 now Patent Number 2,497,216, patented February 14, 1950. The derivative voltage $$\frac{dE}{dt}$$

is proportional in magnitude to the rate of change of angular velocity of the variocoupler shaft 9, and is applied in phase opposition to the $f_2$ input voltages applied to the motor amplifier 29 for stabilizing the operation of the servomotor and for minimizing overshooting and hunting thereof.

The gain of the variable gain amplifier 21 at the power line frequency $f_2$ is a constant times its gain at the frequency $f_1$. Also the gain of the amplifier at the frequency $$f_1 = \frac{E_0}{E}$$

As explained heretofore $f_2$ input signals applied to the variable gain amplifier 21 have a magnitude $E_1 = K_2 E \epsilon$. The output signals at the frequency $f_2$ being a magnitude $$E_s = K_2 K \times K_1 \frac{E_0}{E} = K_1 K_2 E_0 \times \epsilon$$

where $K_1$, $K_2$, and $E_0$ are constants. Thus the input signal applied to the motor drive amplifier 29 has a magnitude dependent only upon the angular deviation from balance $\epsilon$ of the variocoupler rotor.

The circuit of Figure 2 illustrates the components of the portion of the circuit of Figure 1 shown within the dash line block 31. Signals having a frequency $f_2$ derived from the demodulator 19 are applied, through a secondary winding 33 of a transformer 35 and through a serially-connected input capacitor 37, to the second control grid of a hetrode variable gain amplifier tube 39. The second control grid of said amplifier tube is connected to ground through a grid resistor 41. Signals of the frequency $f_1$ having a magnitude corresponding to the input signal amplitude $E \angle \theta_e$ applied to the variocoupler rotor, are applied to the primary winding 43 of the transformer 35 for coupling the $f_1$ signals to the second grid of the variable gain amplifier tube 39.

The cathode of the variable gain amplifier tube 39 is grounded through a cathode resistor 45. The screen electrode is supplied with operating potential through a screen resistor 47, and the screen electrode is by-passed to ground by a capacitor 49. The suppressor electrode is grounded.

Signals derived from the anode of the variable gain amplifier 39 are applied to the input of a series resonant filter 51, which supplies signals of the frequency $f_2$ to the input of the motor amplifier 29. High frequency signal components appearing in the output of the series resonant filter 51 are by-passed to ground by means of a capacitor 53.

The $f_1$ frequency components of the signals derived from the anode of the variable gain amplifier 39 are coupled through a small capacitor 55 to the control electrode of a triode amplifier 57. The control electrode and cathode of the amplifier tube 57 are grounded through resistors 59, 61 and 63. The anode circuit of the triode amplifier 57 includes a parallel resonant circuit 65 which is tuned to the frequency $f_1$. The anode of the triode amplifier 57 is coupled through a small capacitor 67 to the anode of a second triode 69 which is connected as the diode rectifier 25. The cathode of the rectifier tube 69 is connected to ground through the bias battery 27 which represents the source of reference potential $E_0$. The rectified output signals derived from the rectifier tube 69 are applied through a series resistor 71 to the first control electrode of the variable gain amplifier tube 39, whereby the gain of the variable gain amplifier is inversely proportional to the magnitude of the $f_1$ signals applied thereto. As explained heretofore the gain of the variable gain amplifier for the frequency $f_2$ is a constant times the gain at the frequency $f_1$.

Thus the invention disclosed comprises an improved frequency conversion circuit for coupling a resolving variocoupler to a servomotor mechanism for rotating the variocoupler rotor through an angle required to balance the resultant rotor field with respect to a fixed variocoupler stator winding. A single variable gain amplifier is employed for stabilizing the loop gain of the system. A derivative generator is employed for stabilizing the acceleration of the servomotor.

I claim as my invention:

1. In a constant loop gain frequency conversion system for a source of input signals of a first frequency including a pair of coupled circuits responsive to said input signals and a source of signals of a second frequency, the method comprising the steps of deriving control signals of said first frequency having magnitudes proportional to the degree of coupling of said circuits, controlling the magnitude of said second frequency signals as a function of said control signals, amplifying said controlled second frequency and said input first frequency signals, rectifying amplified signals of said input first frequency to derive a control bias voltage, applying said bias voltage to control the amplification gain of said amplified second frequency signals, and deriving an amplified output signal of said second frequency proportional in magnitude to the degree of coupling and substantially independent of the magnitude of said first frequency input signals.

2. In a constant loop gain frequency conversion system for a source of input signals of a first frequency including a pair of coupled circuits responsive to said input signals, a source of signals of a second frequency, and a source of reference potential, the method comprising the steps of deriving control signals of said first frequency having magnitudes proportional to the degree of coupling of said circuits, controlling the magnitude of said second frequency signals in response to said control signals, amplifying said controlled second frequency and said input first frequency signals, rectifying amplified signals of said input first frequency, combining said rectified signals and said reference potential in opposite polarity to derive a control bias voltage, applying said bias voltage to control the amplification gain of said amplified second frequency signals, and deriving an amplified output signal of said second frequency proportional in magnitude to the degree of coupling and substantially independent of the magnitude of said first frequency input signals.

3. In a constant loop gain frequency conversion system including a source of input signals of a first frequency, a pair of coupled circuits responsive to said input signals, a servomotor, a source of signals of a second frequency, for energizing said motor, and a source of reference potential the method comprising the steps of deriving control signals of said first frequency having magnitudes proportional to the degree of coupling of said circuits, applying said control signals to control the magnitude of said second frequency signals, amplifying said controlled second frequency and said first input first frequency signals, rectifying amplified signals of said input first frequency, combining said rectified signals and said reference potential in opposite polarity to derive a control bias voltage, applying said bias voltage to control the amplification gain of said amplified second frequency signals, deriving an amplified output signal of said second frequency proportional in magnitude to the degree of coupling and substantially independent of the magnitude of said first frequency input signals, applying said output signals to energize said motor, and coupling said servomotor to said input signal source to adjust the coupling of said input signals.

4. In a constant loop gain frequency conversion system including a source of input signals of a first frequency, a pair of coupled circuits responsive to said input signals, a servomotor, a source of signals of a second frequency for energizing said motor, and a source of reference potential, the method comprising the steps of deriving control signals of said first frequency having magnitudes proportional to the degree of coupling of said circuits, modulating said control signals and said signals of said second frequency, demodulating said modulated signals to derive a signal of said second frequency which varies in magnitude as a function of said control signal, amplifying said demodulated second frequency and said input first frequency signals, rectifying amplified signals of said input first frequency, combining said rectified signals and said reference potential in opposite polarity to derive a control bias voltage, applying said bias voltage to control the amplification gain of said amplified second frequency signals, deriving an amplified output signal of said second frequency proportional in magnitude to the degree of coupling and substantially independent of the magnitude of said first frequency input signals, applying said output signals to energize said motor, and coupling said servomotor to said input signal source to adjust the coupling of said input signals.

5. A constant loop gain frequency conversion system including a source of input signals of a first frequency, a source of signals for a second frequency, a pair of coupled circuits responsive to said input signals for deriving control signals of said first frequency having magnitudes proportional to the degree of coupling of said coupled circuits, means for controlling the magnitude of said second frequency signals as a function of said control signals, means for amplifying said controlled second frequency and said input first frequency signals, means for rectifying amplified signals of said input first frequency to derive a control bias voltage, means for applying said bias voltage to control the gain of said amplifying means, and means for deriving an amplified output signal of said second frequency proportional in magnitude to the degree of coupling and substantially independent of the magnitude of said first frequency input signals.

6. A constant loop gain frequency conversion system including a source of input signals of a first frequency, a source of signals of a second frequency, a source of reference potential, a pair of coupled circuits responsive to said input signals for deriving control signals of said first frequency having magnitudes proportional to the degree of coupling of said coupled circuits, means for applying said control signals to vary the magnitude of said second frequency signals, means for amplifying said controlled second frequency and said input first frequency signals, means for rectifying amplified signals of said input first frequency, means for combining in opposite polarity said rectified signals and said reference potential for deriving a control bias voltage, means for applying said bias voltage to control the gain of said amplifying means, and means for deriving an amplified output signal of said second frequency proportional in magnitude to the degree of coupling and substantially independent of the magnitude of said first frequency input signals.

7. A constant loop gain frequency conversion system including a source of input signals of a first frequency, a servomotor, a source of signals of a second frequency for energizing said motor, a source of reference potential, a pair of coupled circuits responsive to said input signals for deriving control signals of said first frequency having magnitudes proportional to the degree of coupling of said coupled circuits, means for applying said control signals to control the magnitude of said second frequency signals, means for amplifying said controlled second frequency and said input first frequency signals, means for rectifying amplified signals of said input first frequency, means for combining said rectified signals and said reference potential in opposite polarity to derive a control bias voltage, means for applying said bias voltage to control the amplification gain of said amplified second frequency signals, means for deriving an amplified output signal of said second frequency proportional in magnitude to the degree of coupling and substantially independent of the magnitude of said first frequency input signals, means for applying said output signals to energize said motor, and means for coupling said servomotor to said coupled circuits to adjust the coupling of said input signals.

8. A constant loop gain frequency conversion system including a source of input signals of a first frequency, a servomotor, a source of signals of a second frequency for energizing said motor, a source of reference potential, adjustable coupling means for deriving control signals of said first frequency having magnitudes proportional to the degree of coupling of said input signals, means for modulating said control signals and said signals of said second frequency, means for demodulating said modulated signals to derive a signal of said second frequency which varies in magnitude as a function of said control signal, variable gain amplifying means for said demodulated second frequency and said input first frequency signals, means for rectifying amplified signals of said input first frequency, means for combining said rectified signals and said reference potential in opposite polarity to derive a control bias voltage, means for applying said bias voltage to said variable gain amplifying means to control the amplification gain of said amplified second frequency signals, means for deriving an amplified output signal of said second frequency proportional in magnitude to the degree of coupling and substantially independent of the magnitude of said first frequency input signals, means for applying said output signals to energize said motor, and means for coupling said servomotor to said coupling means to adjust the coupling of said input signals.

9. Apparatus according to claim 5 wherein said coupled circuits comprise a variocoupler for supplying said control signals of said first frequency, a servomotor, means for applying said output signal to energize said motor, and means coupling said motor to said variocoupler to adjust the coupling of said input signals.

10. Apparatus according to claim 8 including a filter for segregating the first frequency and second frequency signal components derived from said amplifying means.

MAURICE LEIGHTON GREENOUGH.

REFERENCES CITED

The following references are of record in the file of this patent:

UNITED STATES PATENTS

| Number | Name | Date |
|---|---|---|
| 2,399,695 | Satterlee | May 7, 1946 |
| 2,436,807 | Isbister | Mar. 2, 1948 |
| 2,438,288 | Jacobson et al. | Mar. 23, 1948 |